Patented Oct. 30, 1928.

1,689,739

UNITED STATES PATENT OFFICE.

CARL METTLER, OF BASEL, SWITZERLAND, ASSIGNOR TO THE FIRM J. R. GEIGY A. G., OF BASEL, SWITZERLAND.

DIPHENYLMETHANE AZO DYESTUFFS AND PROCESS OF MAKING SAME.

No Drawing. Application filed January 14, 1927, Serial No. 161,240, and in Germany January 28, 1926.

When aniline reacts with chloromethyl-ortho-cresotinic acid, there is obtained in good yield aniline-methylene-ortho-cresotinic acid in accordance with the following equation—

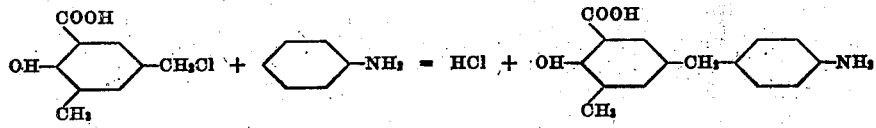

Like derivatives of diphenylmethane are obtained when there is used instead of aniline another amine of the benzene or naphthalene series, and instead of chloromethyl-ortho-cresotinic acid another chloromethylderivative of an ortho-hydroxy-carboxylic acid. Hitherto these compounds have not found application in the manufacture of dyestuffs.

By the present invention a new series of mordant dyeing azo-dyestuffs is obtained by diazotizing a derivative of a diphenylmethane containing in one nucleus an amino-group capable of being diazotized and in the other an ortho-hydroxy-carboxylic acid group, and coupling the product with any azo-dyestuff component.

The dyestuffs thus made are valuable because when a chromium salt is added they yield in cotton printing red and violet tints which are as vivid as those which hitherto have been produced by the dyestuffs of the triphenylmethane series; at the same time the tints have very good fastness to washing, chlorine and light. On the other hand, wool dyestuffs can be made which yield dyeings that when afterchromed are fast to fulling and potting. Finally, these dyestuffs are suitable for making lakes.

That the diphenylmethanes in question could be used for a smooth production of azo-dyestuffs was not to be expected; for nitrous acid frequently acts to decompose such diphenylmethanes having two auxochrome groups in para- or ortho-position to the methane residue, or to oxidize them at the methane group (see German patent specification No. 245,769). The production of such pure tints with these mordant dyestuffs was not to be expected.

The following example illustrates the invention:—

20 kilos of chloromethyl-ortho-cresotinic acid (see German patent specification No. 236,046) are boiled with 200 litres of water and 18.6 kilos of aniline for 16 hours in a reflux apparatus. When the mass has cooled it is made alkaline with sodium carbonate and the unaltered aniline is distilled in steam. By addition of hydrochloric acid the aniline-methylene-ortho-cresotinic acid is precipitated. When dry it is a colorless powder, which is insoluble in water but passes into solution on addition of sodium carbonate or of an excess of hydrochloric acid.

A quantity of the aniline-methylene-ortho-cresotinic acid corresponding with 6.9 kilos of sodium nitrite is diazotized in cold hydrochloric acid and coupled in solution alkaline with sodium carbonate with the sodium salt of 28.8 kilos of 1(2-chloro-5-sulphophenyl)-3-methyl-5-pyrazolone. After stirring during 24 hours, the whole is warmed up and the dyestuff is precipitated by means of common salt as a yellow precipitate. When dried, the dyestuff constitutes a yellow powder, which is difficultly soluble in cold water, easily soluble in hot water with a greenish-yellow coloration and also soluble in concentrated sulphuric acid with a yellow coloration. It dyes wool from an acetic acid bath of greenish-yellow tints which are fast to acid. By subsequent chromation, the coloration changes more to yellow.

The product obtained according to this example may have the following formula:

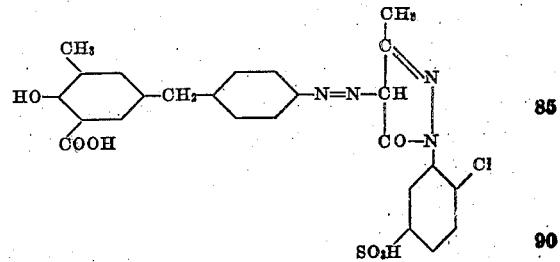

Instead of the amino-compounds named any other amino-diphenylmethane derivative may be used, which can be obtained by reaction of an amine of the benzene or naphthalene series with a chloromethyl-derivative of an aromatic ortho-hydroxy-carboxylic acid, such as salicylic acid, a halogen substitution product of such an acid, an ortho-hydroxy-carboxylic acid of the naphthalene series etc. In general, any diphenylmethane derivative of the kind described may be used.

So also instead of the azo-dyestuff components named any other components of this kind may be used whereby dyestuffs of very different tints and fastness are obtained. When 1-naphtol-3:6-disulphonic acid is used a brown red dyestuff can be obtained which is easily soluble in water to a yellow-red solution and in concentrated sulphuric acid to a yellowish-red solution, and which, when printed on cotton with a chromium salt, gives a clear red color fast to boiling soap, sodium carbonate and chlorine, whilst on wool it yields from an acetic acid bath yellowish-red tints. A more vivid red tint of like properties is obtained when aniline-methylene-ortho-cresotinic acid is coupled with 1-naphtol-3:8-disulphonic acid.

What I claim is:

1. A process for the manufacture of mordant dyeing azo-dyestuffs, consisting in diazotizing a diphenyl-methane derivative which contains in one nucleus an amino-group and in the other an ortho-hydroxy-carboxylic acid group, and coupling with an azo-dyestuff component.

2. A process for the manufacture of mordant dyeing azo-dyestuffs, consisting in diazotizing aniline-methylene-ortho-cresotinic acid and coupling with an azo-dyestuff component.

3. A process for the manufacture of mordant dyeing azo-dyestuffs, consisting in diazotizing aniline-methylene-ortho-cresotinic acid and coupling with 1(2-chloro-5-sulphophenyl)-3-methyl-5-pyrazolone in alkaline solution.

4. As a new article of manufacture, the hereinbefore described mordant dyeing dyestuffs obtained by diazotizing aniline-methylene-ortho-cresotinic acid and coupling with 1(2-chloro-5-sulphophenyl)-3-methyl-5-pyrazolone, constituting in form of its sodium salt a yellow powder difficultly soluble in cold water, easily soluble in hot water with a greenish-yellow color, in concentrated sulphuric acid with a yellow color, dyeing wool from an acetic acid bath greenish-yellow tints, which after chromation change more to yellow.

In witness whereof I have hereunto signed my name this 30th day of December, 1926.

CARL METTLER.